May 22, 1956   O. W. ANDERSON ET AL   2,746,253
BRAKE FLUID LEVEL CONTROL DEVICES
Filed April 19, 1954

INVENTORS,
OSCAR W. ANDERSON &
JACK M. ANDERSON,
BY
Martin E. Anderson
ATTORNEY.

United States Patent Office 2,746,253
Patented May 22, 1956

2,746,253

BRAKE FLUID LEVEL CONTROL DEVICES

Oscar W. Anderson and Jack M. Anderson, Denver, Colo.

Application April 19, 1954, Serial No. 423,989

12 Claims. (Cl. 60—54.6)

This invention relates to improvements in brake fluid level control devices.

The present day automobiles and trucks use hydraulic braking systems almost exclusively and they are extremely dependable if given proper care. Over a period of time some brake fluid is usually lost through evaporation and leakage which causes the brakes to function poorly or fail to operate at all. The occasion on which the brakes fail to operate satisfactorily may result in serious injury or death; and therefore, extreme care should be exercised in having the brakes tested at periodic intervals. Periodic checkups of the brake fluid level in the brake fluid reservoir are frequently neglected due to the relatively inaccessible location of the hydraulic brake master cylinder on most automobiles which makes visual inspection inconvenient.

Several attempts have been made to connect auxiliary brake fluid reservoirs into the braking system whereby fluid lost from the master cylinder brake fluid reservoir would be replenished when needed from the auxiliary reservoir which is readily accessible for filling and inspection by merely raising the hood. However, certain problems have arisen in connection with these auxiliary brake fluid systems which are even more dangerous than those problems attendant to hydraulic systems having no auxiliary supply. With an auxiliary supply system a person is inclined to rely absolutely on the fact that the auxiliary tank is operating to replenish fluid in the master cylinder reservoir; and that, when fluid is present in the auxiliary reservoir the main tank is also filled to the correct level. Therefore, when the auxiliary supply system ceases to function properly, no warning is given if the fluid level in the main reservoir has fallen to a dangerous level.

Some auxiliary brake fluid supply systems are open to the atmosphere which permits dirt to get into the fluid thus causing them to clog and wear rapidly. Others, although closed, will frequently operate for a short period of time and then fail to deliver any more fluid to the master cylinder reservoir. The surface tension of the brake fluid at the ends of the tube which conducts the fluid from the auxiliary reservoir to the master cylinder reservoir is frequently great enough to prevent delivery of fluid if the fluid level in the master cylinder reservoir drops below the discharge end of the tube; or if the supply of fluid in the auxiliary reservoir is lowered to the point where there is insufficient head to force fluid through the tube.

Among the objects of the present invention are to provide; an auxiliary brake fluid supply system which may be relied upon to replenish fluid lost from the master cylinder brake fluid reservoir; a brake fluid level control device which is provided with means for overcoming surface tension both at the intake and discharge ends of the tube connecting the auxiliary reservoir with the master cylinder reservoir, thus insuring delivery of fluid when necessary; an auxiliary brake fluid system which is substantially closed to the atmosphere to prevent dirt from entering the system; and a device in accordance with the present invention which is simple, inexpensive, readily adaptable to many different styles and types of hydraulic brake systems, and which may be quickly connected into conventional hydraulic brake systems for dependable trouble-free operation, without otherwise changing the conventional practice.

Other objects will be in part apparent and in part pointed out specifically hereinafter in connection with the description of the drawing which follows; and in which, Figure 1 is a side view in half section showing the brake fluid level control device of the present invention operatively interconnected with the master cylinder brake fluid reservoir;

Figure 1:
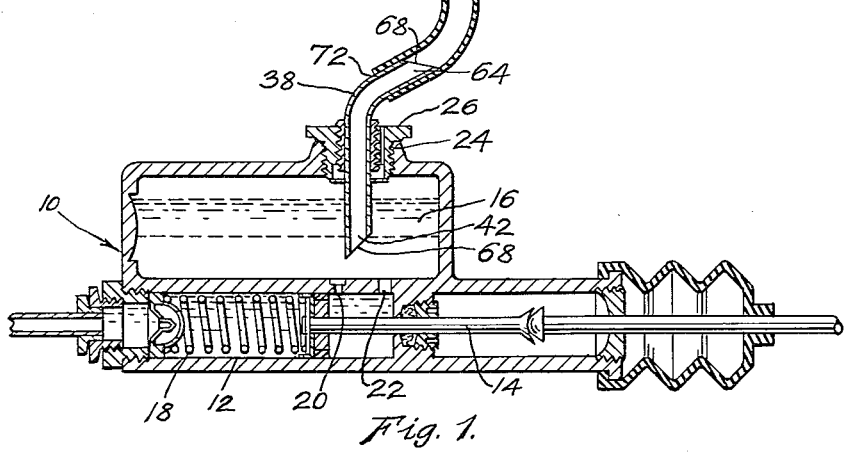

Referring now to Figure 1 of the drawing, reference numeral 10 indicates in a general way the hydraulic brake master cylinder which is of a well known construction. It will be helpful in understanding the manner in which the brake fluid level control device of the present invention cooperates with the conventional hydraulic braking system to designate the various parts of the master cylinder with reference numerals. The cylinder has been designated by numeral 12, the piston by numeral 14, and the master cylinder reservoir by numeral 16. Compression spring 18 mounted between the end wall of the cylinder and the piston forces the piston towards retracted or brake-release position. Compensating port 20 and breather port 22 communicate the cylinder and the reservoir. The fill opening has been designated by numeral 24 and the screw plug threaded into the fill opening by reference numeral 26.

Figure 4:
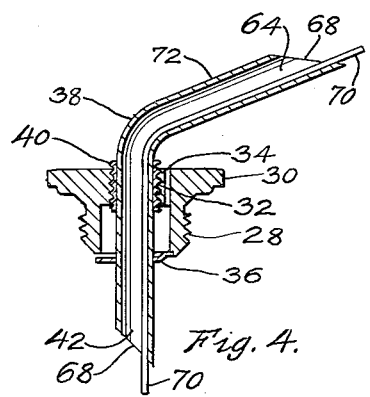
Figure 4 is an enlarged view in half section showing the screw plug provided with a discharge tube having means in addition to the structure illustrated in Figure 1 for reducing surface tension.

Referring now more particularly to Figure 4, it will be seen that the screw plug 26 has a threaded section 28 and a flange 30. The top is provided with a threaded opening 32 and an air hole 34. A splash plate 36 is fastened to the lower end which prevents the brake fluid from escaping through the air hole. Discharge tube 38 is threadedly connected within the threaded opening 32 of the screw plug by means of the threaded tubular connector 40. The discharge end 42 of the discharge tube extends downward into the main reservoir 16, as shown most clearly in Figure 1, to the point representing the lowest safe level of the brake fluid in the main reservoir. Air passes into the air hole 34 into the auxiliary supply system to prevent air-locking.

Referring again to Figure 1 the auxiliary brake fluid reservoir 44 is fastened to the fire wall 46 within sheet metal bracket 48 in position to be clearly visible when the hood of the vehicle is raised, or may be installed conveniently within the truck cab or car itself. Auxiliary brake fluid reservoir 44 is preferably a transparent container such as a glass bottle having a neck 50 provided with external screw threads. Bracket 48 is adapted to support the brake fluid reservoir on each side of the neck by spaced supporting fingers 51 having upturned ends shown most clearly in Fig. 2. The upper end of the bracket projects outward at right angles to the fire wall 46 and is turned downward at its outer end 52. A screw cap 54 is fitted to the neck of the auxiliary brake fluid reservoir and intake tube 56 is threaded into a threaded opening 58 within the cap. These parts may also be pressed together. Flexible tube 60 connects the inner end 62 of the intake tube 56 and the inner end 64 of the discharge tube 38. Thus, the interior of the auxiliary brake fluid reservoir is connected to the interior of the master cylinder reservoir by means of intake tube 56, flexible tube 60, and discharge tube 38 thereby forming an air tight brake fluid level control system when the discharge end 68 of the discharge tube is beneath the surface of the fluid in the master cylinder.

Figure 2:
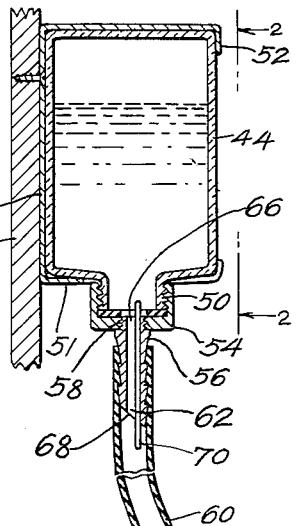
Figure 2 is a front elevation of the auxiliary brake fluid reservoir as it would be seen in the direction of arrows 2—2 of Figure 1.
Figure 2:
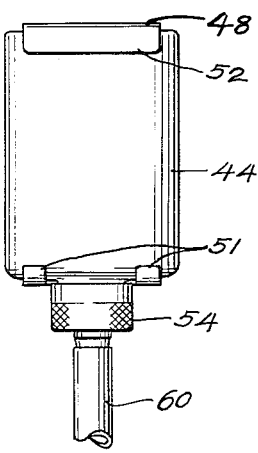

Fig. 2 illustrates the manner in which the bracket holds the auxiliary brake fluid reservoir to the fire wall. It is fastened at a point on the fire wall where it may be easily removed to replenish the supply of brake fluid as well as inspected when the hood is raised. When the various parts are assembled as shown in Fig. 1, a closed system, except for air hole 34, results which prevents dirt from entering the system.

The most important feature of the present invention resides in the means by which surface tension is reduced on the ends of tubular members 38 and 56 to insure the fact that the brake fluid will flow and maintain the desired level in the master cylinder reservoir. In connection with Figures 5, 6 and 7, it will be seen that each of the tubes is provided with a pointed end formed either by an inclined surface or a wire-like member fastened inside the tube extending beyond the end, or a combination of both. Each of these pointed projections on the tube ends effects a sufficient reduction in surface tension to permit the brake fluid to flow from the auxiliary reservoir to the master cylinder reservoir. It has been found that both the discharge end 42 and intake end 66 must be provided with one of the three types of pointed projections illustrated in Figures 5, 6 and 7 in order to accomplish the necessary reduction in surface tension. Although the embodiment of the present invention illustrated in the accompanying drawing employs both an intake tube 56 and a discharge tube 38 connected together by a flexible tube 60 for greater flexibility in use, it is to be understood, that the auxiliary brake fluid reservoir may be connected to the main reservoir by a single tube made of metals such as brass or copper, plastics, or any other suitable material, as long as the intake and discharge ends are provided with pointed projections. If separate intake and discharge tubes are used as shown, the inner end 64 of the discharge tube, and the inner end 62 of the intake tube, must also be provided with pointed projections.

Figure 5:
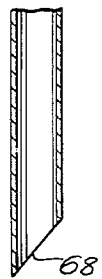
Figure 5 is a fragmentary half section of a tube provided with an inclined surface at its lower end to reduce surface tension.

Figure 5 shows the end of a tube cut on the bias to form inclined surface 68 which lowers the surface tension of a liquid passed through the tube by spreading the surface film at the end over an area great enough to allow the gravitational effect of the liquid lying above the end to overcome the effect of the surface tension and cause the liquid to flow.

Figure 6:
Figure 6 is a fragmentary half section of a tube having a square cut lower end with a wire-like member fastened to the inner wall in position to extend beyond the end to reduce surface tension.

Figure 6 shows a modified form of the pointed projecting end which may be used in place of the inclined surface shown in Figure 5 to reduce surface tension on the end of the tube. In this modification the tube is cut off square and the pointed projection provided by a wire-like member fastened to the inner wall with its end extending beyond the end of the tube. This construction also causes the film of liquid on the end of the tube to spread out over a greater area and reduces the surface tension.

Figure 3:
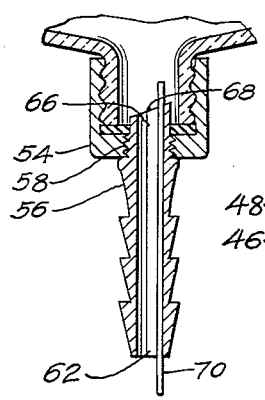
Figure 3 is an enlarged fragmentary view in half section which shows the intake tube threaded onto the mouth of the container which forms the auxiliary reservoir and showing the ends of the tube provided with the modified construction to reduce surface tension over that shown in Figure 1.
Figure 7:
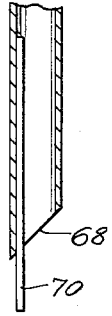
Figure 7 is a fragmentary half section of a portion of pipe provided at its lower end with both an inclined surface and a wire-like member to reduce surface tension.

Figure 7 is illustrative of a further modification of the pointed projection in which the end of the tube is provided with both an inclined surface 68 and a wire-like member 70. The pointed projection illustrated in Figure 7 produces a greater reduction in surface tension than either the inclined surface or wire-like member alone. The wire-like member is preferably positioned in the tube to extend beyond the end along the surface of the pointed portion of the inclined surface 68. Wire-like member 70 may either be solid or hollow. Various combinations of the pointed projections illustrated in Figures 5, 6 and 7 have been shown on the intake and discharge tubes in Figures 1, 3 and 4 hereof. The preferred combination is that illustrated in Figure 1 because of its effectiveness and simplicity of manufacture. Any combination of the specific forms of pointed projections on the intake and discharge ends is effective. The inner ends of the intake and discharge tubes must also be provided with one or both of elements 68 and 70 if the intake and discharge tubes are separate as shown.

One remaining feature provided on the discharge tube 38 is shown in Figures 1 and 4. In most passenger automobiles the master cylinder brake fluid reservoir 16 is positioned at a point underneath the floorboards of the automobile and behind the portion of the fire wall to which the auxiliary reservoir is attached. This, of course, requires the connection between the reservoirs to curve. If the discharge tube 38 is straight and connected to the intake tube by means of a flexible tube there is danger than the flexible tube may become kinked and shut off the supply of brake fluid. Therefore, to provide a smooth gravity flow the discharge tube is preferably bent as shown in Figures 1 and 4 at a point above the screw plug forming leg 72. Leg 72 must, however, be inclined above horizontal when the screw plug is positioned within the master cylinder reservoir or it will tend to retard flow of the fluid.

It is to be understood that the elements of the present invention may be formed of metal, plastic, or any other suitable materials, and still operate satisfactorily.

Having thus described the invention and its several modifications, it will be seen that the many useful objects for which it was constructed have been achieved; and therefore, I claim:

1. In a device for use in automatically maintaining the level of the brake fluid in a hydraulic brake master cylinder reservoir which has a top provided with a threaded fill opening, an auxiliary reservoir positioned above the master cylinder for holding a reserve supply of brake fluid, a screw plug having an air hole and adapted to be threadedy engaged in the fill opening to close the same, and an air tight tubular connection passing through the top of the screw plug and connecting the interior of said container with the interior of said reservoir for transferring the brake fluid from the auxiliary reservoir to the master cylinder reservoir; the improvement which comprises: pointed projections formed on the intake and discharge ends of the tubular connection for reducing the surface tension.

2. A device in accordance with claim 1 in which, the pointed projections comprise inclined surfaces.

3. A device in accordance with claim 1 in which, the pointed projections comprise a wire-like member attached to the inner wall of the tube and extending beyond the ends thereof.

4. A device in accordance with claim 1 in which, the pointed projections comprise an inclined surface at the discharge end and a wire-like member attached to the inner wall of the tube extending above the intake end.

5. A device in accordance with claim 1 in which, at least one end of the tubular connection is provided with an inclined surface and at least one end is provided with a wire-like member attached to the inner wall of the tube extending beyond said end.

6. A device in accordance with claim 1 in which, both the intake end and the discharge end of the tubular connection are provided with both an inclined surface and a wire-like member attached to the inner wall of the tube extending beyond the ends along the surface of the pointed portion of the inclined surface.

7. A device in accordance with claim 1 in which, at least one end of the tubular connection is provided with both an inclined surface and a wire-like member attached to the inner wall of the tube extending beyond said end along the surface of the pointed portion of the inclined surface.

8. A device in accordance with claim 1 in which, the tubular connection comprises an intake tube having the intake end, a discharge tube having the discharge end, and a flexible tubular member connected between the intake and discharge tubes.

9. A device in accordance with claim 1 in which, the tubular connection comprises an intake tube having the intake end and an inner end, a discharge tube having the discharge end and an inner end, and a flexible tubular member connected between the inner ends of the intake and discharge tubes, said inner ends being provided with pointed projections.

10. A device in accordance with claim 1 in which, the tubular connection comprises a straight rigid intake tube having the intake end and an inner end, a curved rigid discharge tube having the discharge end and an inner end, and a flexible tubular member connected between the inner ends of the first and second tubes, said inner ends being provided with pointed projections and said curved discharge tubes being bent at a point above the screw plug to form a leg inclined above horizontal when positioned within the hydraulic brake master cylinder.

11. A device in accordance with claim 10 in which, the intake end of the intake tube is provided with a wire-like member attached to the inner wall of the tube extending above said intake end, the inner end of the intake tube is provided with an inclined surface and a wire-like member attached to the inner wall of the tube extending below said end from the projecting portion of the inclined surface, and the curved discharge tube is provided with an inclined surface at both the inner end and the discharge end.

12. A device in accordance with claim 10 in which, the intake and discharge tubes are provided with at least one end having an inclined surface.

References Cited in the file of this patent

UNITED STATES PATENTS

| 1,931,278 | Wilkes | Oct. 17, 1933 |
| 2,241,188 | Dick | May 6, 1941 |

FOREIGN PATENTS

| 11,432 | Great Britain | May 19, 1903 |